Patented Apr. 14, 1931

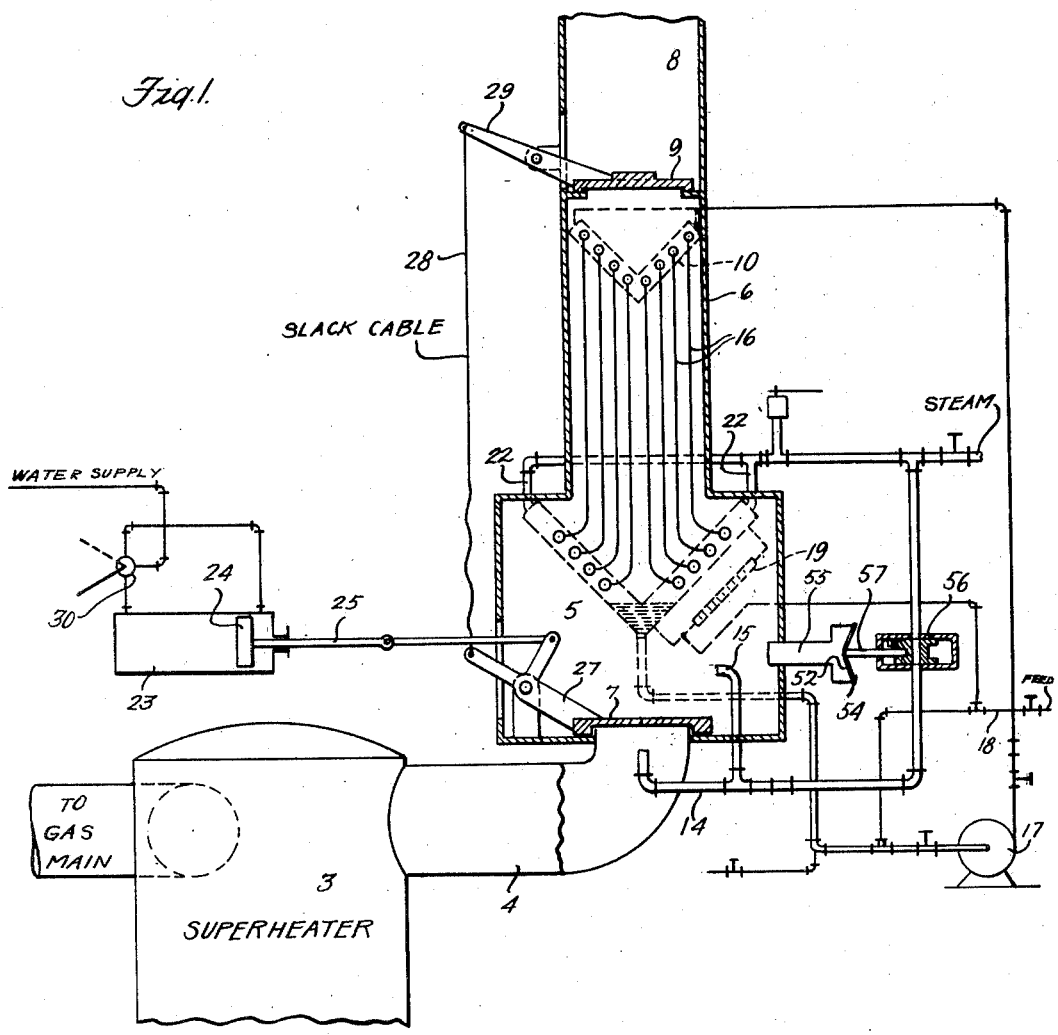

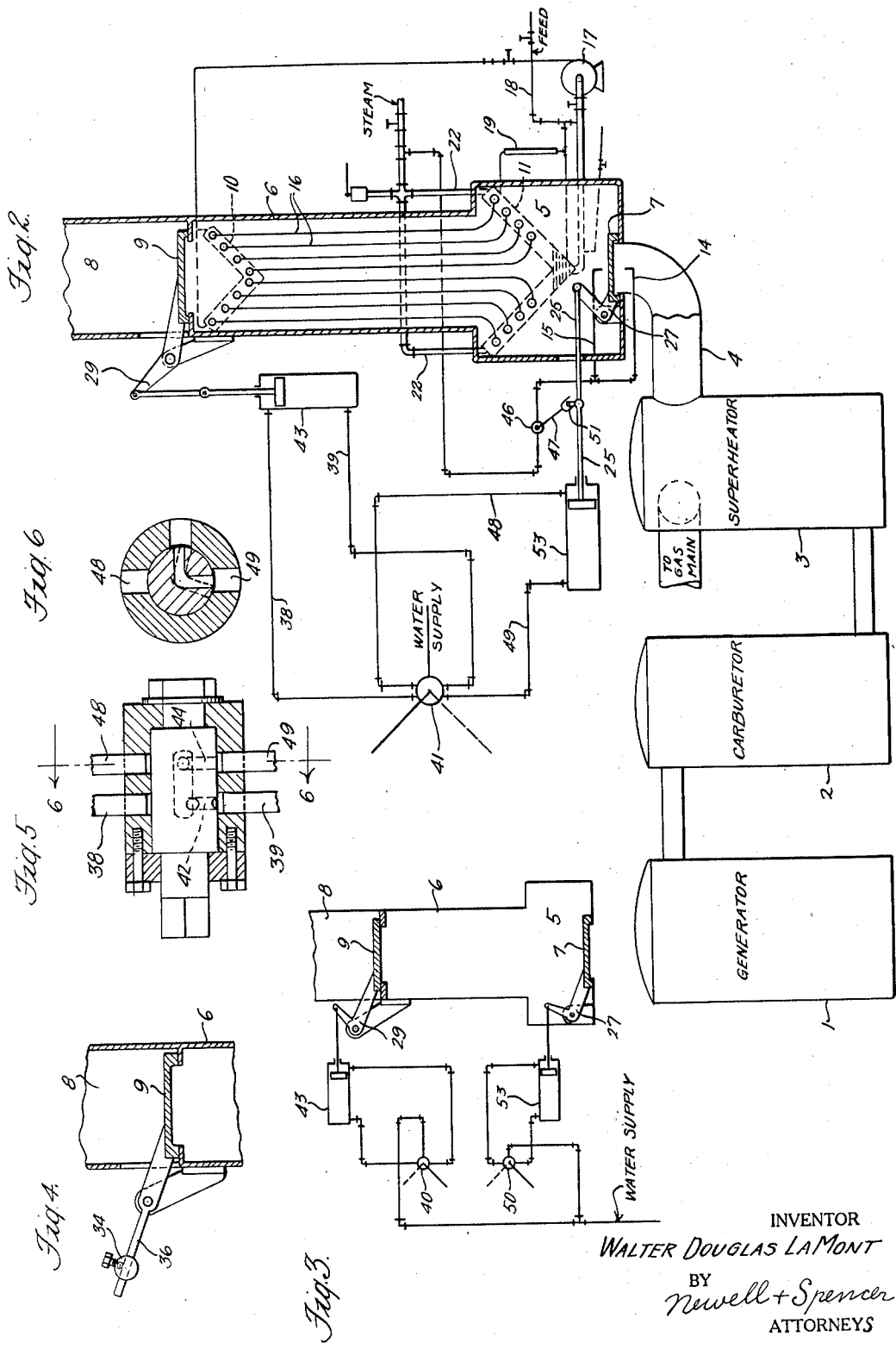

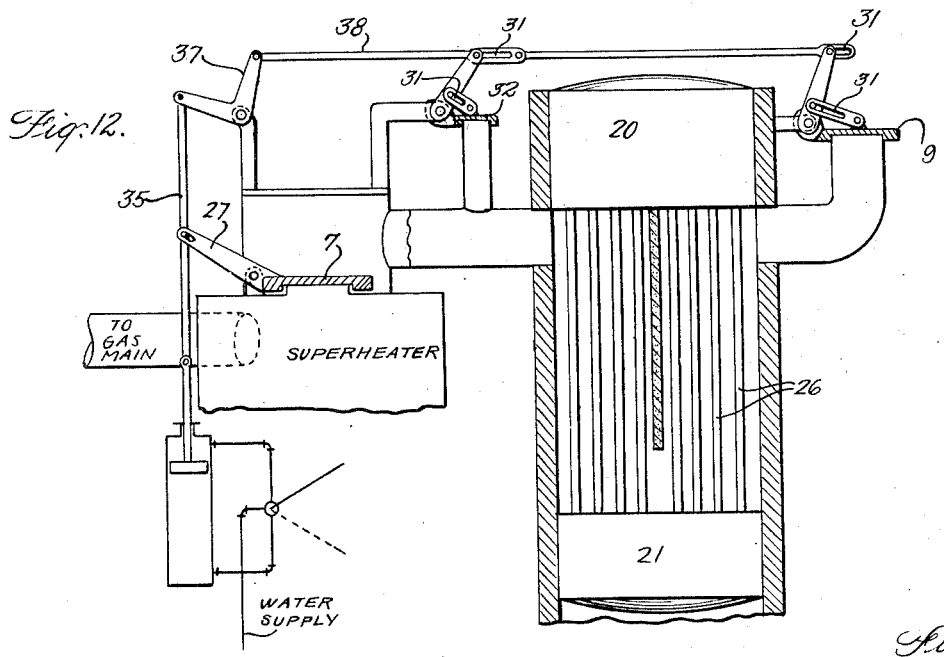
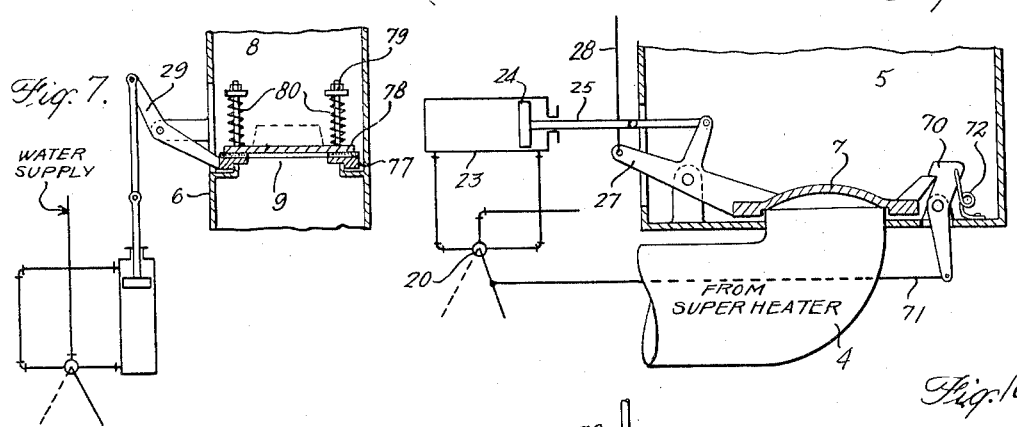
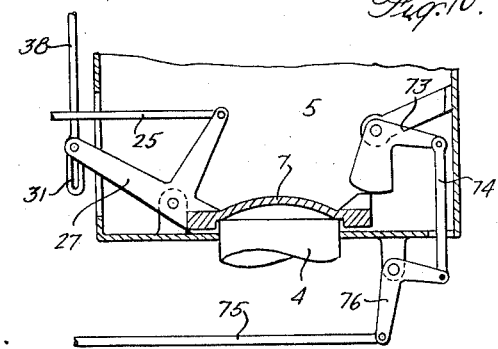
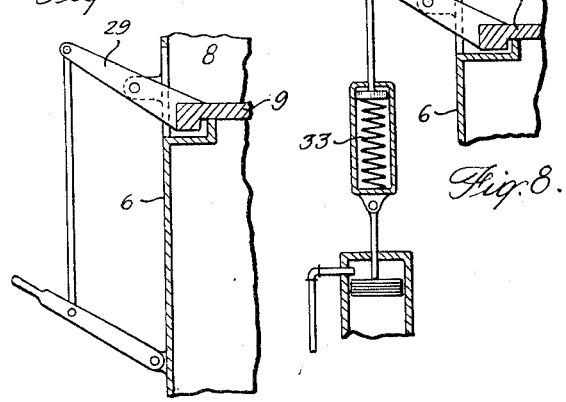

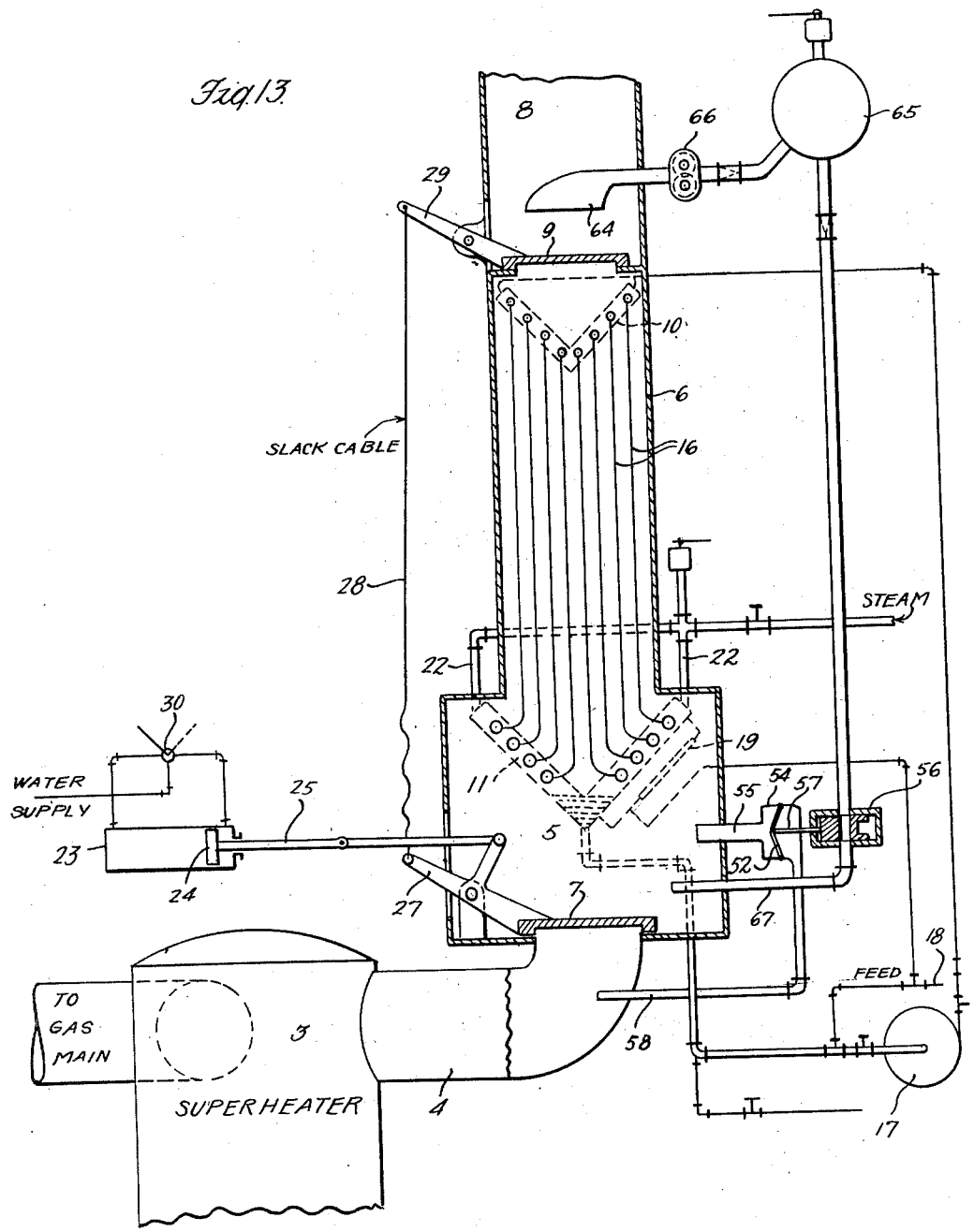

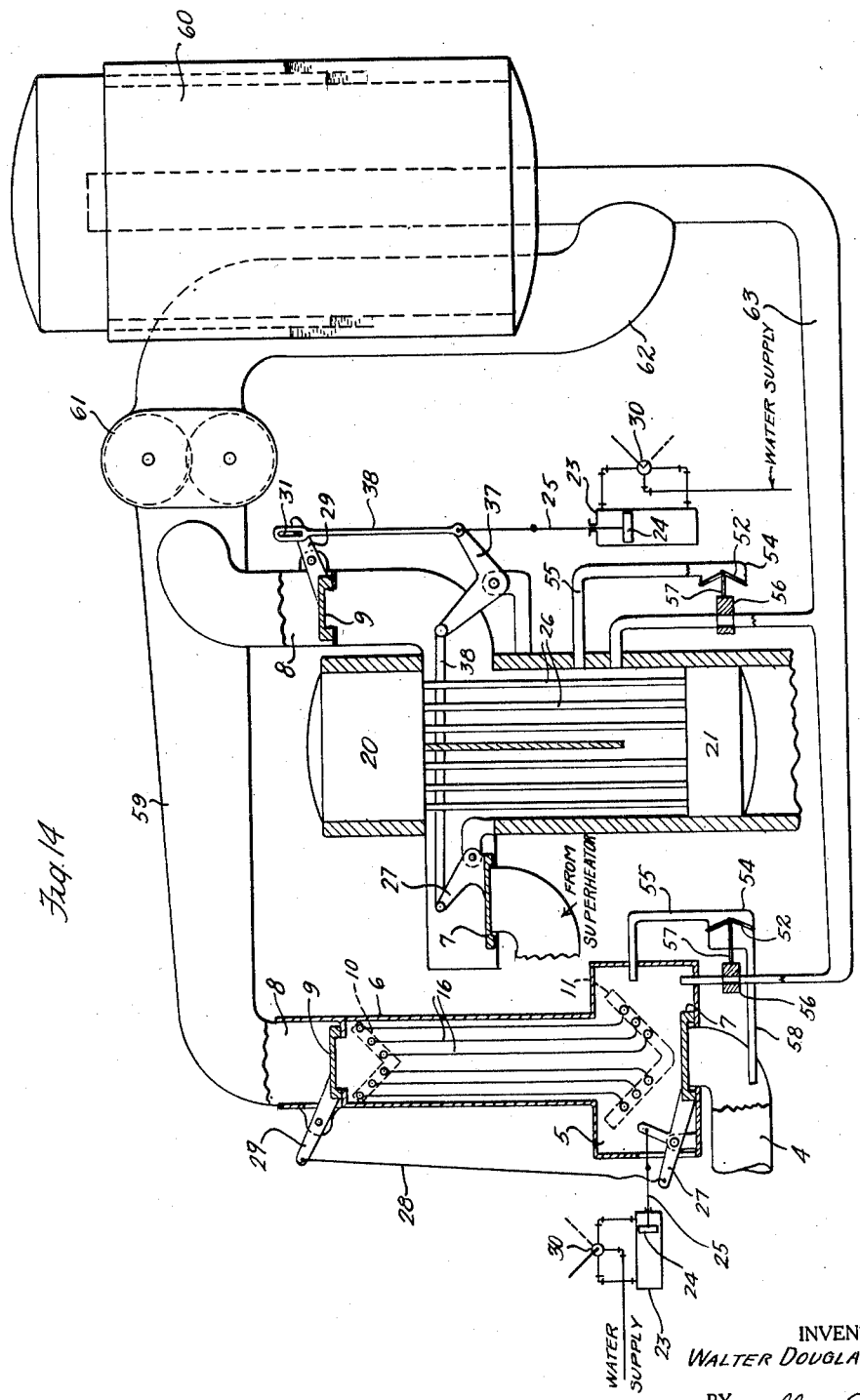

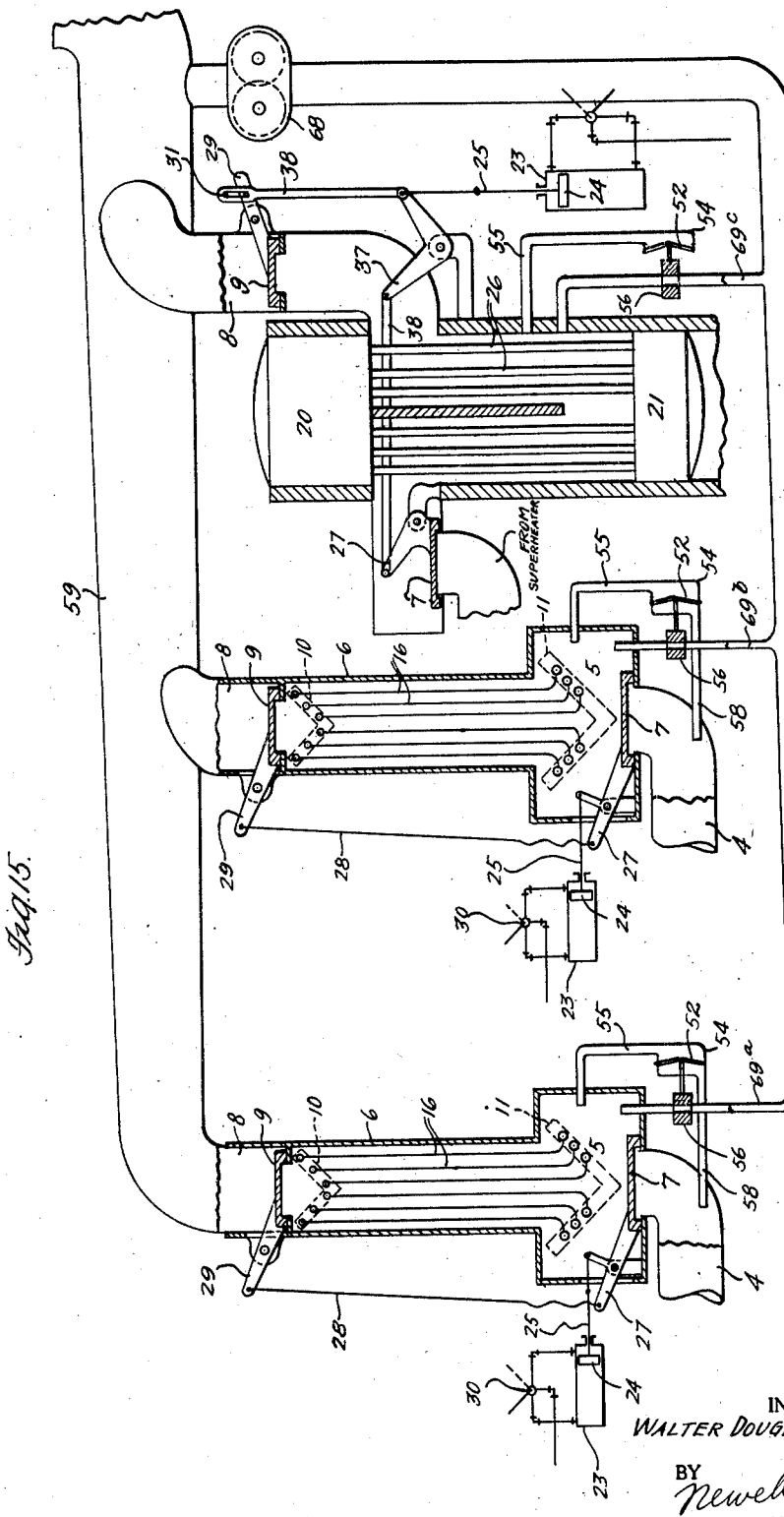

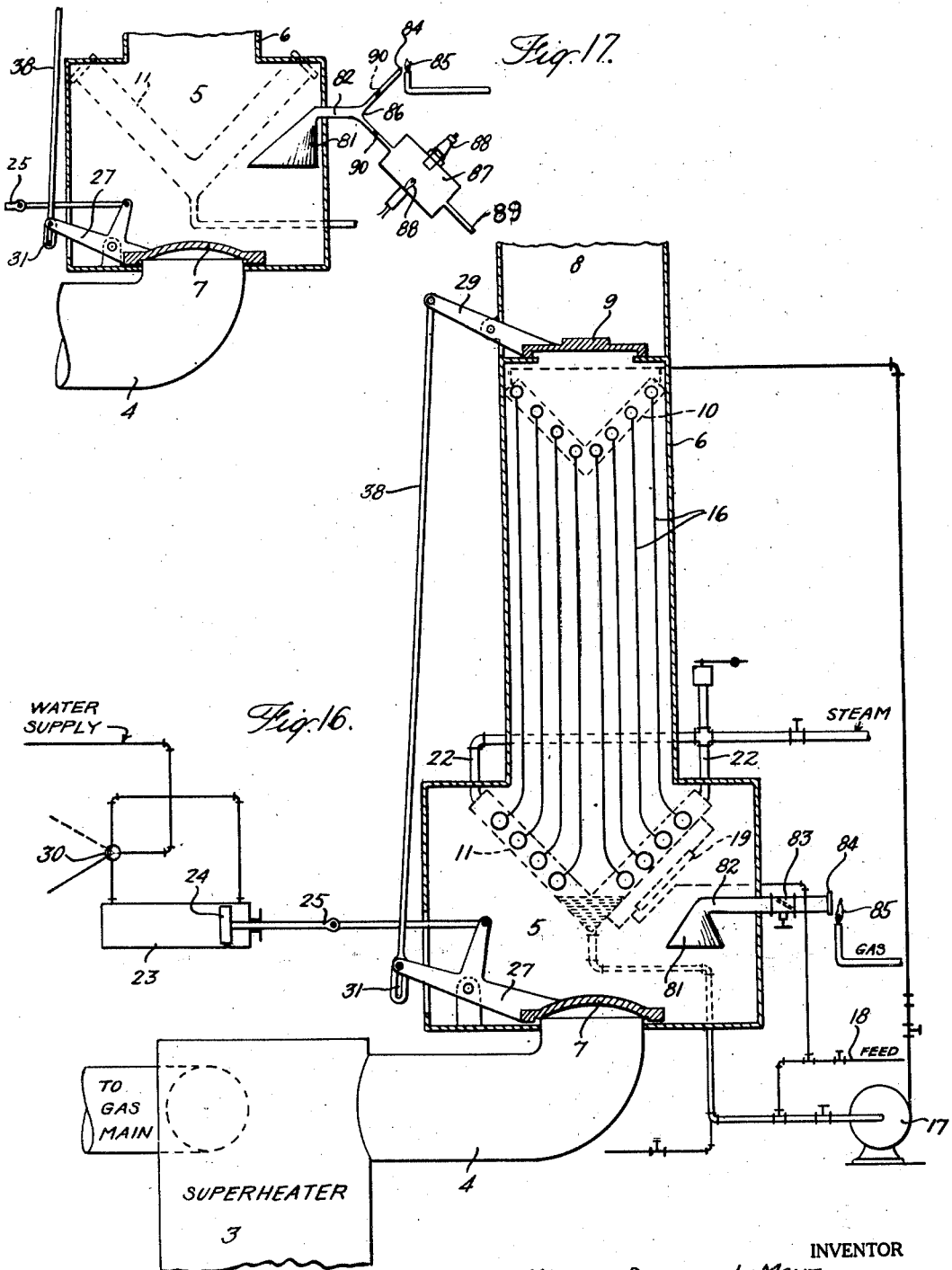

1,801,013

UNITED STATES PATENT OFFICE

WALTER DOUGLAS LA MONT, OF NEW ROCHELLE, NEW YORK, ASSIGNOR TO LA MONT CORPORATION, OF NEW YORK, N. Y., A CORPORATION OF NEW YORK

WASTE-HEAT STEAM-GENERATING SYSTEM

Application filed December 22, 1925. Serial No. 76,945.

This invention relates to waste heat steam generating systems and more particularly to the operation of waste heat steam generators.

In the past, waste heat steam generators which have been operated in conjunction with gas producers of various types in which alternate flows of combustible and hot, relatively non-combustible gases are produced, have been open to many objections and disadvantages.

During the so-called "blow" period of gas producers, large amounts of hot combustion gases are produced and passed over the steam generating surfaces to produce steam. At the end of the blow period, it is necessary to make some provision for preventing the combustible gases produced during the so-called "make" period from entering the gas spaces of the steam generator and also to prevent the leakage of air into the gas spaces of the steam generator which might result in the production of an explosive mixture and which would then be ignited on the next succeeding blow, serious explosions being the result.

In the past, it has been proposed to close the gas exit from the steam generator, which is frequently, though not invariably, into the atmosphere, by means of a valve. A clapper type valve is usually used. This system does not operate satisfactorily since there is always a tendency for air to leak into the gas spaces of the steam generator and there is also a tendency for combustible gases to be sucked into the heat chamber generator during the "make" owing to the fact that the gases in the steam generator gas spaces cool and hence contract, producing a partial vacuum which tends to suck in air through any leaks and also to suck in combustible gases from the producer. The amount of combustible gases which are sucked into the gas spaces of the generator is largely increased due to the fact that these gases tend to diffuse into the generator through the relatively large entrance main. Not only does the presence of combustible gases lead to danger of explosions when air also leaks in, but there is a considerable loss of valuable combustible gases.

In order to avoid the serious explosions which would frequently follow from the gas exit valve system, a large amount of steam is injected into the heat chamber of the steam generator, and in some cases into the connection from the gas producer in order to fill the generator gas spaces with steam and prevent leakage of air or combustible gases into the generator. This system operates with fair success but is very inefficient and is open to numerous disadvantages. In the first place, the amount of steam consumed is considerable, as, in general practice, a very rapid flow of steam is injected into the generator gas spaces and the steam which is usually at a lower temperature than the generator surfaces tends to cool the generator down with consequent loss in steam generating efficiency. In addition to the large waste of steam and heat, careful control would be necessary in order to prevent steam from backing up into the gas producer and reaching the gas mains.

The present invention has for its object the improvement of waste heat steam generating systems and particularly providing more efficient and reliable operation of waste heat generators and gas producers.

With these and other objects in view, the present invention in its broader aspects includes the feature of a double valve for each steam generator, one closing the gas exit from the generator gas space and the other shutting the generator gas space off from the gas producer.

In its preferred embodiment, the invention also includes other features, such as the introduction of inert gases into the steam generator, the automatic regulation and maintenance of a pressure within the steam generator gas space greater than either the pressure in the gas exit, the communicating main to the producer, or the atmosphere, the provision of various automatic means for closing the valves and introducing inert gases, testing the gases in the steam generator at all times for combustibility and explosiveness and other features which will be apparent on a more detailed description of the invention and its various modifications.

In another application, Serial No. 99,243, filed April 2, 1926, I have shown and described various methods of preventing leakage in valves by maintaining a pressure differential. In said application the improvement is broadly claimed while in the present application one of its more specific embodiments is claimed.

In its essence, the present invention is not limited to any particular type of waste heat steam generator and may be applied with suitable structural modifications to any of the well known types. I have found that the system of the present invention can be very efficiently incorporated in film tube waste heat steam generating systems such as those described in my co-pending application, Serial No. 32,064, filed May 22, 1925. The invention is, however, in no sense limited to this particular design of waste heat steam generator, but is of general application.

The invention will now be more fully described in connection with the drawings which illustrate, for the most part in diagrammatic form, several modifications of the invention as applied to different installations and different types of boilers. Specifically, film tube steam generators of the La Mont type and water tube generators of the common Wickes type have been illustrated in some of the figures of the drawings, but it should be clearly understood that these are illustrations only and that the invention is in no sense limited to the types of generators shown in the drawings, but can be applied generally to any type of steam generator used in a waste heat steam generating system.

Fig. 1 is a diagrammatic elevation of a waste heat generating system using a film tube boiler provided with steam injection and an automatic pressure regulator;

Fig. 2 is a diagrammatic elevation of a similar type of waste heat generating system illustrating a different method of valve control combined with automatic steam injection;

Fig. 3 is a diagrammatic representation of another modification of hydraulically-operated valves;

Fig. 4 is a detail sectional view of an automatic gas exit valve;

Fig. 5 is a detail section of a differential hydraulically controlled valve shown in Fig. 4, and Fig. 6 is a detail of the ports of the valve;

Fig. 7 is a section from a gas exit valve provided with an explosion door;

Fig. 8 is a detail of a modified spring slack drive for a hydraulically operated gas exit valve;

Figs. 9 and 10 are diagrammatic representations of generator shut-off valves provided with positive locking means, Fig. 9 showing a latch lock, and Fig. 10 a cam lock;

Fig. 11 is a diagrammatic representation of an independently manually operated gas exit valve;

Fig. 12 is a section from a Wickes steam generator showing arrangements of valves operated from a single hydraulic source;

Fig. 13 is an elevation partially in section of a film tube steam generating system with inert blow gas injection and automatic pressure control;

Fig. 14 is an elevation partly in section of a plurality of waste heat steam generating systems connected to a common exit gas main and showing provision for storing inert blow gases;

Fig. 15 is a diagrammatic representation of three waste heat steam generating systems having a common blow gas main and showing direct injection of blow gas without storage;

Fig. 16 shows a film tube steam generator provided with a manually-operated combustibility tester;

Fig. 17 is a detail of a combustion chamber showing a combustibility and explosibility tester arranged for continuous operation.

The gas producer as shown in Figs. 1 and 2 consists of a generator 1, a carburetor 2, Fig. 2, and a super-heater 3 connected through a pipe 4 with the heat chamber 5 of a steam generator 6. The diagrammatic representation of the gas producer corresponds to an ordinary water gas producer with provisions for carburetting the gas. It should be understood that the invention is in no sense limited to this general type of gas producer and any gas producing mechanism which alternately produces relatively inert "blow" gases with combustible "make" gases is included in the invention.

The communicating main 4 is closed by a clapper valve 7 while the connection between the steam generator and the gas exit or flue 8 is closed by the clapper valve 9. The clapper valves per se are of the type generally used in waste heat steam generators but the invention is in no sense limited to valves of this type and includes any valve mechanism which can be operated to open and close the gas entrance and gas exit. The valves should preferably seat as gas tightly as possible, although even in the case of leaky valves, the provision of two valves greatly reduces leakage from the gas entrance main as the combustible gases in the main have to leak through two valves in order to reach the exit main instead of only through a single valve as in previous constructions.

The steam generator shown in Figs. 1, 2, 13 and 16 is of the La Mont film tube type provided with upper headers 10, lower headers 11 and generating tubes 16. Water circulation is effected by the pump 17 in the usual manner, feed water being supplied through the pipe 18, and the water level in the lower header operating on a suitable regulator 19.

Steam is collected from the top of the lower headers through the pipes 22.

The steam generator shown in Fig. 12 is of the Wickes water tube type, being provided with upper and lower water drums 20 and 21, connected by the tubes 26. Figs. 14 and 15 show both Wickes and La Mont type generators.

Steam injection means 14 and 15, (Fig. 2), are provided for injecting steam into the heat chamber above the shut-off valve 7 and into the gas entrance main 4 below the valve. In the modification shown in Figs. 13, 14 and 15, inert blow gases are used instead of steam, the injection in Figs. 13 and 14 being on one side of the shut-off valve only. When blow gases are taken directly from the gas exit main, they are at relatively high temperatures and result in less loss of heat in the generator than when steam is used.

The valves may be opened and closed by various means and particularly it is desirable to close one valve before the other is completely closed. In general, it is desirable to close the gas exit valve first, although for some purposes the reverse arrangement may be desirable. The valves may be independently operated manually, as indicated in the case of the gas exit valve 9 in Fig. 11, wherein a lever 29 is connected by a link to a hand lever of the second class, but in general, one or both of the valves are preferably positively opened by hydraulic pressure or mechanically and in the case of the shut-off valve, the closure should also be positive for best results.

A number of methods of operating the valves are shown in the various figures. Fig. 1 shows a hydraulic opening of both of the valves by means of the cylinder 23, piston 24, links 25, bell crank 27, flexible cable 28 and arm 29. The fluid pressure supply is controlled through the single valve 30. When the valves are to be opened, fluid is forced into the right hand side of the cylinder 23, moving the piston and, through the links, rocking the bell crank 27 which serves to open the valve 7 and through the cable 28 and arm 29, also the valve 9. The reverse operation takes place when the valves are to be closed, but owing to the fact that there is slack in the cable 28, valve 9 is enabled to close by its own weight before the valve 7 is completely closed, which results in building up the pressure of blow gas in the generator and heat chamber, the pressure, of course, depending upon the amount of slack in the wire 28 and weight of the valve 9. A similar operation is shown in Fig. 13.

Figs. 12 and 16 show a somewhat different modification in which rods take the place of the wire 28 and slack is provided for by the slots 31. In Fig. 12, illustrating a Wickes type of boiler, the rod 38 is horizontal and is operated from the piston through the link 35 and bell crank 37. The effect is the same except that in Fig. 12, the gas entrance is provided with an auxiliary valve 32. This auxiliary valve provides one way of testing the gases for combustibility as will be explained more fully hereinafter.

A similar effect is illustrated in Fig. 8 where a spring 33 takes the place of a slack cable or slotted rod. In the fully automatic weighted exit gas valve shown in Fig. 4, the valve closes as soon as the blow stops because of its own weight, the pressure which it permits in the generator being adjusted by moving the weight 34 on the arm 36.

Positive hydraulic operation of both valves is shown in Figs. 2 and 3. In the latter, two hydraulic cylinders 43 and 53, each operate their respective valves and are controlled by separate control valves 40 and 50. The operation is fully manual.

In Fig. 2, the hydraulic cylinders 43 and 53 are controlled by parallel pipes 38, 39, 48 and 49 and double valve 41. This double valve is provided with two sets of ports 42 and 44, which are staggered so that the port controlling the pipes 38 and 39 opens slightly before that controlling the pipes 48 and 49 with the result that hydraulic cylinder 43 is operated a little sooner than 53, closing the valve 9 before the valve 7 is completely closed. The amount of lag or lead depends upon the pressure which it is desired to build up in the generator at the end of the blow.

Injection of steam or inert combustion gases may be effected manually or automatically by the operation of the shut-off and exit valves, or by the pressure differential existing between the gas spaces of the generator and the atmosphere or the entrance gas main.

Automatic operation by actuating the valves is shown in Fig. 2 where the steam injection valve 46 is provided with a forked arm 47 which is rocked by the lug 51 on the valve link 25.

Pressure control injection is shown in Figs. 1, 13 and 14. In Fig. 1, the pressure differential between the gas spaces of the generator and the atmosphere is used to actuate the diaphragm 52 in the controller 54, which is connected to the heat chamber of the generator by the tube 55. The movement of the diaphragm is communicated to the valve 56 by means of the rod 57.

In Figs. 13 and 14, the pressure differential is between the gas spaces of the generator 6 and the intake gas main 4, the latter being connected to one side of the diaphragm by means of the pipe 58.

In Figs. 1 and 2, the steam for injection is taken from the steam generator through the pipes 22. In Figure 14, blow gas collected in the exhaust main 59 is forced into the holder 60 by means of the blower 61 and pipe 62. From the holder, the gas is injected into the generator heat chamber through the pipe 63.

In Fig. 13, blow gas is collected from the exit gas main 8 by the collector 64 and forced into the pressure tank 65 by the blower 66. The gas is then injected into the heat chamber through the pipe 67 controlled by the valve 56. In Fig. 15, blow gas from the exit gas main is introduced into the respective generator heat chambers by means of the blower 68 through the pipes 69a, b, and c, controlled by the valves 56. Where a plurality of generators are operating in rotation. preferably with overlapping blow periods, there is always blow gas in the exit gas main, providing a constant supply of inert blow gas.

In order to lock the shut-off valve more firmly and particularly to prevent any sudden fluctuations of pressure in the producer during the make from forcing combustible gas into the generator heat chamber by lifting the shut-off valve 7, it may be desirable to lock positively the shut-off valve in closed position. Two types of locking means are illustrated in Figs. 9 and 10. In the former figure, a latch 70 is operated from the hydraulic valve 20 through the wire 71. The latch is normally held in locking position by the spring 72, but is forced to one side by the closing of the shut-off valve and snaps into place, locking it positively. On operating the hydraulic valve 20 to open the shut-off valve, the pull on the cable 71 trips the latch 70 and frees the valve.

A somewhat different locking means is shown in Fig. 10, where a cam 73 operated through the links 74 and 75 and bell crank 76, is manually brought into engagement with the shut-off valve when the latter is closed and must be first released before the valve can open.

Obviously, these locking means are merely illustrations of various possible types and their operation may be combined with the operation of the shut-off valve so as to render them fully automatic.

In order to protect the steam generator from possible explosions which might occur when the gas producer is improperly operated, for example, when the amount of air is temporarily reduced during the "blow", or an explosive mixture is introduced into the gas spaces of the generator, through any other means, explosion doors may be provided and I have found that a satisfactory explosion door for minor explosions may be incorporated in the gas exit valve 9 as shown in Fig. 7. In the modification shown in this figure, the valve consists of a ring 77 and a plate 78 provided with holes through which the bolts 79 pass and are rigidly fastened to the ring 77. Springs 80 normally hold the plate and ring tightly in contact and a gas tight valve may be provided by use of suitable gaskets. When an explosion temporarily greatly increases the pressure, the springs are compressed, lifting the plate and providing for a safety outlet for the excess pressure. As soon as the pressure has again dropped, the safety door closes and the valve is in a position to resume its normal functions.

A weighted valve as shown in Fig. 4 will obviously automatically act as an explosion door and if desired, other explosion doors may be provided in the generator shell. These doors are not shown in the drawings and may be of any suitable construction.

The present invention provides for the practically complete isolation of the gas spaces of the generator from both the atmosphere and the entrance gas main during the make period and in the modifications in which inert gas injection controlled by pressure differentials is embodied, the gas spaces of the generator may always be kept at a pressure greater than that of the atmosphere and also greater than that of the entrance gas main so that even if there are slight leaks in either of the valves or in the generator shell, inert gas from the gas spaces of the generator will leak out and neither air nor combustible gas from the entrance gas main can enter. An explosion is, therefore, practically impossible except by improper operation of the gas producer or carelessness in operating the valve-closing mechanism. This latter source of danger may be obviated by connecting the valve closing mechanism or its control valves directly or indirectly with the mechanism for shifting the cycle of the gas producer so that when the producer is thrown from "blow" to "make", or vice versa, the valves will automatically be either opened or closed. Such a parallel connection of controls by hydraulic, mechanical, electrical, or other suitable means will, of course, be obvious to those skilled in the art and is not shown in the drawings but is included in the invention.

In order to still further prevent the possibility of explosions, I prefer to embody means for testing the character of the gas in the gas spaces of the generator, either intermittently or continuously. These testing means are shown in Figs. 16 and 17. Fig. 16 shows a collector 81, a pipe 82 controlled by a combined shut-off and check valve 83 and an exit orifice 84. A pilot light 85 is kept constantly burning below the exit orifice. Whenever it is desired to test the character of the gas in the heat chamber of the generator, the valve 83 is turned and if the gas is combustible in nature, on issuing from the orifice 84, it will be ignited by the pilot light 85 and will at once warn the operator that the heat chamber contains a gas which is combustible and suitable precautionary means, such as the injection of large amounts of inert gases, may be employed to overcome the danger.

Instead of an intermittent testing means, tests may be run continuously as shown in Fig. 17 where the collector 81 and pipe 82 permit a fine stream of gases to flow in the Y 86, one leg being provided with an orifice 84 adjacent to pilot light 85, as in Fig. 16, and the other leg being provided with a chamber 87 and a spark plug of other ignition device 88. If the gas which is in the generator heat chamber is combustible but not an explosive mixture, the stream flowing through the pilot light will be ignited but the spark plug or ignition device will be without effect in the chamber 87 which communicates with the air only through a narrow orifice 89. If, however, an explosive mixture of combustible gas and air is present in the generator heat chamber, not only will the portion flowing over the pilot light be ignited, but the portion flowing through the chamber 87 will also be ignited and will continue to burn as long as the mixture contains sufficient air to be explosive. The orifices 84 and 89 communicating with the atmosphere are so small that even if temporarily the gas pressure in the heat chamber falls below that of the atmosphere, only an insignificant amount of air can leak in through the minute orifices. A check valve similar to the check and shut-off valve 83, shown in Fig. 16, may be incorporated where it is desired to prevent even this insignificant leakage.

Metal gauze 90 is preferably incorporated in both legs of the Y so that in case of explosive gas ignited either by the pilot light or the spark plug, the flame will not travel back into the heat chamber.

The invention has been described in considerable detail in connection with a number of types of waste heat steam generator installations and methods of operating the valves. The drawings which illustrate these embodiments are designed to show a maximum of different modifications and the combination of a particular valve drive feature with other features not directly related to it is not to be taken as an indication that the particular combination is either necessary or particularly desirable. Thus, the fact that a single hydraulic operation of both valves by means of a slotted rod in Fig. 16 is shown as combined with an installation containing a La Mont film tube steam generator and testing device, but without inert gas injecting means, should not be considered to indicate that this particular valve drive is necessarily bound up with the other features shown.

Similarly, Figs. 14 and 15 show water tube and film tube steam generators with a common exhaust main, but this is merely for the purpose of illustrating several types of boilers and should not be taken as indicating the necessity or even desirability of always using a plurality of boiler types in a particular installation. The combination of the various features and modifications best suited for a particular installation will, of course, vary and the invention is in no sense to be taken as limited to combinations shown in the drawings.

Numerous modifications and variations of features and installations shown in the drawings will be apparent to those skilled in the art and are included in the present invention, thus, for example, a plurality of producers may be connected to a single steam generator, inert blow gas injection may be combined with steam and numerous other variations may be made within the scope of the present invention.

The invention is also not limited to steam generators which are operated solely by waste heat and in certain cases it may be desirable to run a steam generator part of the time by waste heat and part of the time by active combustion as from an oil burner, powdered coal burner or the like. Such variations may be made and are within the scope of the present invention and the modifications necessary, such as for example, providing an individually operated exit gas valve, as illustrated in Fig. 11.

The invention has been illustrated for the most part diagrammatically as it is applicable to waste heat steam generators of the types commonly used and in its broader aspects, is not dependent on any particular type or construction of generator.

Structural modifications of the valve and their drive may, of course, be necessitated by particular structural features of certain steam generators as is shown, for example, in the different placement of valve driving rods for La Mont film tube and for Wickes water tube boilers. The invention is accordingly not limited to any particular structural details shown or to any particular placement of the valves, valve drives or other accessory features and the modifications which may prove necessary to incorporate the exit and entrance valves of the present invention to particular installations are included in and form part of the present invention.

In the claims, the expression "gas producer" is to be understood in a broad sense in which this expression was employed in the introductory portions of this specification and applies to any device or system which intermittently supplies combustible and hot non-combustible gases, whether the combustible gases produced are to be used as ordinary illuminating gas for metallurgical purposes or for any other use.

I claim:

1. In a waste heat steam generating system, a gas producer, a steam generator having a heat chamber communicating with the producer, a gas exit connection from the generator, a valve closing the gas exit connection, a valve shutting off the generator from the producer, hydraulic means for opening and closing the valves consisting in a separate piston and cylinder for each valve, a common source of fluid pressure and a double port control valve having ports for the two cylinders so staggered as to effect the complete closing of one valve before complete closing of the second valve.

2. In a waste heat steam generating system, a gas producer, a steam generator having a heat chamber communicating with the producer, a gas exit connection from the generator, a valve closing the gas exit connection, a valve shutting off the generator from the gas producer, and an explosion door in the gas exit valve adapted to open temporarily when the pressure in the steam generator chamber passes a predetermined maximum.

3. In a waste heat steam generating system, a gas producer, a steam generator having a heat chamber communicating with the producer, a gas exit connection from the generator, a valve closing the gas exit connection, a valve shutting off the generator from the gas producer, and means for automatically introducing an inert gas into the generator heat chamber when the pressure therein falls below a predetermined amount.

4. In a waste heat steam generating system, a gas producer, a steam generator having a heat chamber communicating with the producer, a gas exit connection from the generator, a valve closing the gas exit connection, a valve shutting off the generator from the gas producer, means for introducing an inert gas into the generator heat chamber when the valves are closed, said means being automatically actuated by the closing of the valves.

5. In a waste heat steam generating system, a gas producer, a steam generator having a heat chamber communicating with the producer, a gas exit connection from the generator, a valve closing the gas exit connection, a valve shutting off the generator from the gas producer, means for introducing a gaseous medium into the generator heat chamber when the valves are closed, a valve controlling the introduction of said gaseous medium, said control valve being actuated by a drop in pressure in the generator heat chamber below a predetermined figure.

6. In a waste heat steam generating system, a gas producer, a steam generator having a heat chamber communicating with the producer, a gas exit connection from the generator, a valve closing the gas exit connection, a valve shutting off the generator from the gas producer, means associated with the gas exit connection for storing part at least of the inert products of combustion during the operation of the steam generator, and means for introducing said stored combustion products into the generator heat chamber.

7. In a waste heat steam generating system, a plurality of gas producers, a plurality of steam generators having heat chambers communicating with the producers, a gas exit connection from each of the steam generators to a common exhaust main, a valve closing each gas exit connection, a valve shutting off each generator from its producer, and means for introducing inert products of combustion from the exhaust main into the heat chambers of the steam generators in which the gas exit and shut off valves are closed.

8. In a waste heat generating system a gas producer, a steam generator having a heat chamber communicating with the producer, a gas exit connection from the generator, a valve closing the gas exit connection, a valve shutting off the generator from the producer, means for operating said valves to close off the generator from the atmosphere and from the gas producer and to create a pressure in the generator chamber, and a relatively small orifice through which the gas in the generator is forced by the pressure thus created to enable said gas to be tested for combustibility and explosiveness.

9. In a waste heat generating system, a gas producer, a steam generator having a heat chamber communicating with the producer, a gas exit connection, means for shutting off the heat chamber of the generator from the gas producer, and means constructed to coact with said shutting off means to shut off the heat chamber from the exit connection, the arrangement being such as to alternately confine the gases in said generator during the "make" period and to permit gas flow through said generator during the "blow" period.

10. In a waste heat steam generating system a gas producer, a steam generator having a heat chamber communicating with the producer, a gas exit connection, a valve arranged to close the exit connection, a second valve arranged to close off the generator from the producer, means for positively opening both valves and means for positively closing at least one of the valves.

11. In a waste heat steam generating system a gas producer, a steam generator having a heat chamber communicating with the producer, a gas exit connection, a valve arranged to close the exit connection, a second valve arranged to close off the generator from the producer, means for positively opening and closing the second mentioned valve, means for positively opening the first mentioned valve, the construction and arrangement being such that said latter valve is also automatically opened at predetermined pressures in the heat chamber of the steam generator.

12. In a waste heat steam generating system a gas producer, a steam generator having a heat chamber communicating with the producer, a gas exit connection, a valve arranged to close the exit connection, a second valve arranged to close off the generator from the producer, and means for operating the valves so that the valve closing the gas exit operates before the valve shutting off the generator from the producer.

13. In a waste heat steam generating system a gas producer, a steam generator having a heat chamber communicating with the producer, a gas exit connection, a valve arranged to close the exit connection, a second valve arranged to close off the generator from the producer, and means for maintaining a pressure in the steam generator heat chamber when said valves are closed greater than the pressure in either the gas exit connection, the gas producer or the atmosphere.

Signed at New York, New York, this 21st day of December, 1925.

WALTER DOUGLAS LA MONT.